March 2, 1943. E. ZDANSKY 2,312,463
POCKET FLASHLIGHT
Filed Feb. 3, 1941
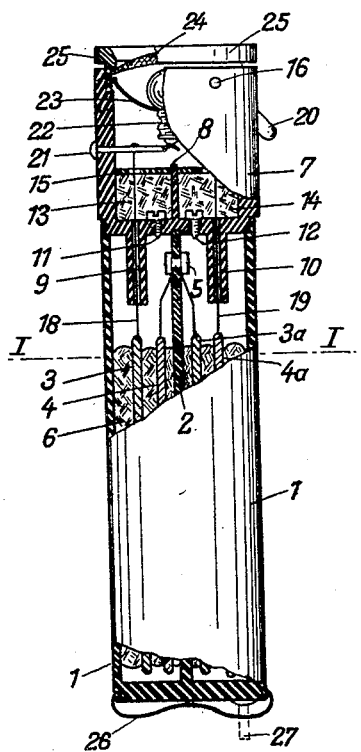
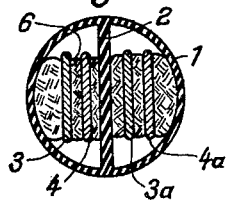
Inventor:
EWALD ZDANSKY
BY Richardson and Quer
Atty's.

Patented Mar. 2, 1943

2,312,463

UNITED STATES PATENT OFFICE 2,312,463

POCKET FLASHLIGHT

Ewald Zdansky, Gross-Glienicke, Germany; vested in the Alien Property Custodian

Application February 3, 1941, Serial No. 377,158
In Germany February 3, 1940

7 Claims. (Cl. 240—10.6)

The invention relates to battery-containing pocket flashlights, and is particularly concerned with structures of this type, wherein the source of current consists of a two-cell alkaline secondary battery of the type of the Edison accumulator.

The most important object of my invention consists in the provision of a flashlight of the character noted above, having novel and well-tested means for preventing the leakage and seepage of the liquid electrolyte from the casing thereof in order to avoid corrosion of the casing and of the contacts, as well as the danger of destruction of articles of clothing of the user.

Another object of my invention resides in the provision of a light, handy and shock-proof pocket flashlight, which can be repeatedly recharged as a unit in its sealed unitary condition, and from which no electrolyte can flow to the outside even if such recharging is carried out by an unskilled person and without special supervision.

Other objects of the invention will be disclosed in the accompanying drawing and in the following description.

Fig. 1 shows an embodiment of the novel flashlight in side elevation, and partially in section to illustrate more clearly the parts essential for the invention; and Fig. 2 is a cross-section of the lamp on line I—I of Fig. 1.

The tubular vessel or casing 1 which forms the outer walls of the new flashlight is made of lye-proof artificial material such for instance as vinylester-polymers or polystyrols. This vessel serves as a holder for the battery and is separated by a partition 2 into two individually sealed separate cells. Each one of these cells contains a pair of electrodes 3, 4 or 3a, 4a, respectively, of an Edison accumulator, which means that each cell contains an iron plate and a nickel plate or an iron plate and a cadmium plate. A rivet 5, tightly inserted in the partition 2 and to which the iron plate of the one cell or the nickel plate of the other cell are connected serves to connect the two cells in series. This rivet is preferably coated with an insulating varnish after the connection has been established. The electrode plates project somewhat above the level of the liquid electroylte for the purpose of reducing the tendency of the accumulator to give up gas during the charging thereof. In order to prevent the liquid electrolyte from splashing about in the interior of the vessel 1, the space between the electrode plates and the walls of each one of the two cells is filled by a packing 6 capable of retaining the electrolyte. This packing may consist, for instance, of wound glass fabric.

The tubular vessel 1 is closed at the upper end by a member 7 tightly fixed, for instance, cemented on the outer wall of the vessel and on the central partition 2. This member may be in the shape of a round pot, the bottom of which serves as a lid for the vessel 1, the lower part being subdivided into two chambers by a partition 8. In these chambers terminate tubes 9 and 10 which serve as ventilating passages for the two accumulator cells and extend close to the upper edge of the electrode plates 3 or 4a respectively. The admission openings of the two accumulator cells are tightly closed by screws 11 and 12.

In case the structure should be turned upside down only that portion of the electrolyte which is not retained by the packing 6 will collect upon the bottom wall of the member 7 around the tubular extensions 9 and 10 facing downwardly into the battery chamber of the vessel 1. Liquid electrolyte can thus never flow out of these tubular extensions; only vapors of the electrolyte can escape through them.

In order to keep away these vapors from contact elements of the structure and to prevent escape towards the outside, the two chambers, provided in the lower part of the member 7 in which chambers the ventilating tubes 9 and 10 terminate, are filled with packings 13 and 14. These packings may consist for instance of impregnated, lye absorbing fabrics or stoppers of fibrous material; a stopper of cellulose wadding is usually sufficient.

If vapors or traces of condensed liquid electrolyte escape from the ventilating tubes 9, 10, they are taken up by the packings 13, 14 and are completely retained therein. The partition 8 ensures then, that no electrolytic shunt to the two cells can be produced, even if the lower zones of the packings 13, 14 of filling mass might become slightly moist due to condensation of the vapors in the packings. The surfaces of the packings are covered by a thin plate 15 of insulating material which may be perforated and may be clamped in position. A communication with the outside is thus established through the upper part of the member 7 which, if desired, may be provided with a hole 16, to keep the packing surfaces dry. These surfaces give up to the air only water vapor because the corroding constituents of the small quantities of electrolyte depositing in the packings 13, 14 are absorbed or chemically bound by these packings.

The leads 18, 19 are extended upwardly above the covering plate 15 and are there connected with the contact elements of the switch and the incandescent lamp. They can extend in the manner shown directly through the ventilating tubes 9 and 10 and through the protecting packings 13, 14. It is, however, also possible to conduct these leads through separate tubes, which may be filled with insulating mass, and arranged so as to extend through the bottom of the member 7.

In order to charge the accumulator of the flashlight without opening the structure, it is advisable to provide separate charging contacts on the outer wall thereof. These contacts may be arranged for engagement with the poles of the charging apparatus through a suitable holder. The structure becomes especially simple, by arranging these charging contacts on the sides of the member 7. The lever 20 of the switch is best used directly to serve as one of the charging contacts, so that it is merely necessary to provide an additional single charging contact for this purpose. This form of construction is illustrated by Fig. 1.

As can be seen, the lever 20 of the switch projects towards the right from the upper part of the member 7. This switch lever is made of metal and directly connected with the lead 19. The second charging contact is provided by the head of a pin 21, to which is welded the lead 18 and the resilient end of which produces the connection with the socket plate of the incandescent bulb 22.

In order to make the protecting packings 13, 14 as well accessible and as easily exchangeable as possible it is advisable to make a structural unit of the lamp casing, which contains the lens and the reflector and if desired also the lamp holder and the switch. This structural unit is clamped onto the upper end of the member 7 merely by means of elastic elements. The lamp casing in Fig. 1 therefore consists of the reflector 23 which at the center serves simultaneously as holder for the incandescent bulb 22 and terminates at the outer end in a bordered ring which is inserted into the member 7 at the upper edge thereof. This reflector 23 and the lens 24 are securely held in their position by the resiliently inserted metal ring 25.

In order to prevent cracking of the vessel 1 in case the flashlight is accidentally dropped, it is advisable to mount a resilient metallic protecting cap 26 over the bottom of the vessel 1. This protecting cap can also be used to cover the rudiment of the die casting bar 27 indicated in dash lines, which is produced in the casting of the vessel 1 and may be cut off short without subsequent machining to smooth out the surface.

The use of the protecting cap 26 makes it possible to construct the wall of the vessel 1 relatively thin resulting in a light weight structure.

I claim:
1. An electric lighting device comprising an elongated casing, a first transverse partition disposed in said casing and forming a closed lower and an open-ended upper compartment therein, a wet re-chargeable battery disposed in said lower compartment, a plurality of tubular extensions projecting from said first transverse partition downwardly into said lower compartment, a second transverse partition in said upper compartment forming a lower and an upper chamber therein, an absorbent packing disposed in said lower chamber, contact means disposed in said upper chamber and projecting laterally through the casing wall to the outside thereof, conductor means extending through said tubular extensions for engagement with terminals of said battery and for engagement with said contact means, and an electric lamp assemblage removably attached to the open end of said upper compartment for coaction with said contact means.

2. The structure and combination defined in claim 1, together with a partition extending longitudinally from said second named tranverse partition downwardly through said lower chamber in the upper compartment and through the lower compartment and dividing said chamber and said compartment into two sections, one of said tubular extensions projecting from said first named partition downwardly into each section of the lower compartment.

3. In combination, an elongated open-ended casing, a second open-ended casing having substantially similar lateral dimensions as the first casing fixed upon the open end of said first casing and extending therefrom, the bottom wall of said second casing forming a transverse member closing the open end of said first casing, a transverse partition in said second casing forming a bottom chamber therein, operative contact means in said second casing above the bottom chamber thereof, a wet re-chargeable battery disposed in said closed first casing, conductor means extending from said battery through said transverse member to said contracts, absorbent packing in the bottom chamber of said second casing, and an electric lamp assemblage removably connected with the open end of said second casing for coaction with said operative contact means.

4. The combination and structure defined in claim 3, together with re-charging contact means on the outside wall of said second casing connecting with the operative contact means therein.

5. The combination defined in claim 3, together with means for venting gases from said first casing and preventing escape of electrolyte therefrom in inverted position thereof comprising a tubular extension projecting from the bottom wall of said second casing downwardly into said first casing.

6. The combination and structure defined in claim 3, together with a longitudinal partition for dividing the interior of said first casing into two battery cells, a longitudinally extending partition in the bottom chamber of said second casing forming vent cells filled with said absorbent packing, and tubular members projecting from the bottom wall of said first casing downwardly into said battery cells for communication with said vent cells.

7. The combination and structure defined in claim 3, together with a vent opening in the wall of said second casing above the contact means therein for ventilating said casing.

EWALD ZDANSKY.